US008241716B2

(12) United States Patent
Bastioli et al.

(10) Patent No.: US 8,241,716 B2
(45) Date of Patent: Aug. 14, 2012

(54) VENTILATED SYSTEM FOR THE COLLECTION OF ORGANIC WASTE

(75) Inventors: Catia Bastioli, Novara (IT); Francesco Degli Innocenti, Novara (IT); Maurizio Tosin, Serravalle Sesia (IT)

(73) Assignee: Novamont S.p.A., Novara (IT)

( * ) Notice: Subject to any disclaimer, the term of this patent is extended or adjusted under 35 U.S.C. 154(b) by 1359 days.

(21) Appl. No.: 11/570,036

(22) PCT Filed: May 30, 2005

(86) PCT No.: PCT/EP2005/005795

§ 371 (c)(1), (2), (4) Date: Dec. 4, 2006

(87) PCT Pub. No.: WO2005/118434

PCT Pub. Date: Dec. 15, 2005

(65) Prior Publication Data

US 2007/0228046 A1 Oct. 4, 2007

(30) Foreign Application Priority Data

Jun. 3, 2004 (IT) .............................. MI2004A1125
Oct. 28, 2004 (IT) .............................. MI2004A2048

(51) Int. Cl.
*B32B 1/02* (2006.01)
*B32B 23/00* (2006.01)
*B32B 1/08* (2006.01)

(52) U.S. Cl. ..................... 428/35.2; 428/34.1; 428/34.2; 428/35.7; 428/35.9; 428/36.9

(58) Field of Classification Search ................. 428/34.1, 428/34.2, 35.7, 35.9, 36.9, 35.2
See application file for complete search history.

(56) References Cited

U.S. PATENT DOCUMENTS

| | | | | |
|---|---|---|---|---|
| 6,062,228 | A | 5/2000 | Loercks et al. | |
| 6,096,809 | A * | 8/2000 | Lorcks et al. | 524/47 |
| 6,223,927 | B1 | 5/2001 | Rand | |
| 6,235,816 | B1 | 5/2001 | Lorcks et al. | |
| 6,344,535 | B1 * | 2/2002 | Timmermann et al. | 528/310 |
| 7,048,975 | B1 * | 5/2006 | Tojo et al. | 428/34.3 |
| 2003/0166820 | A1 | 9/2003 | Ishino et al. | |

FOREIGN PATENT DOCUMENTS

| | | |
|---|---|---|
| DE | 8806132 | 9/1988 |
| DE | 196 30 235 | 1/1998 |
| JP | H11500629 A | 1/1999 |
| JP | 2004149679 A | 5/2004 |
| WO | WO-99/01361 | 1/1999 |
| WO | WO-99/48969 | 9/1999 |

OTHER PUBLICATIONS

International Search Report dated Sep. 19, 2005, No. PCT/EP2005/005795. 3 pages.
Office Action issued in corresponding JP Application No. 2007-513830 mailed Jan. 5, 2011.

* cited by examiner

*Primary Examiner* — Marc Patterson
(74) *Attorney, Agent, or Firm* — Connolly Bove Lodge & Hutz LLP

(57) ABSTRACT

Ventilated system for the collection and temporary storage of organic waste which comprises a rigid container provided with a plurality of holes and a removable bag inserted in and supported by said container. The bag is supported by the container in a spaced relationship with respect to the ground or the surface on which said container is placed, so that air can flow from the bottom into the bag. The bag is obtained from a breathable biodegradable plastic.

20 Claims, 2 Drawing Sheets

VENTILATED SYSTEM FOR THE COLLECTION OF ORGANIC WASTE

The present invention relates to a ventilated system for the collection and temporary storage of organic waste. More in particular, the invention relates to a ventilated system for the collection and temporary storage of organic waste that is to undergo composting.

Composting is the industrial process that imitates, in a reproducible, controlled and fast way, the processes that in nature restore organic substances to the life cycle. In nature, the organic materials no longer "useful" for life (dry leaves, branches, remains of animals, etc.) are decomposed by the micro-organisms present in the soil, which restore it to the natural cycle. The less degradable components that are left constitute the humus, which consequently represents a true reserve of nourishment for plants given its capacity of releasing slowly but constantly the nutritive elements contained therein (nitrogen, phosphorus, potassium, etc.). This ensures constant fertility of the soil. Industrial composting is therefore a process whereby structures are developed for managing in a rational and controlled way the microbiological activities that spontaneously occur in nature, with the aim at reducing the time necessary to obtain a sort of humus, i.e., compost, and of improving the quality of the end product as compared to what is obtained by the natural process.

Industrial composting has formed the subject of numerous studies, and many are the composting plants that have adopted highly sophisticated processes and systems.

One of the main obstacles, however, that stand in the way of diffusion of composting is linked to the evil-smelling and rapidly putrescible nature of organic waste, with the corresponding high economic cost of the operation of waste collection.

This is all the more noticeable if it is considered that the differentiated collection of the organic fraction of the waste becomes increasingly necessary also in view of the European standards that will introduce the obligation not to dump waste with organic content exceeding 5% by 2006.

If, in the light of said requirement, it is considered that the total amount of urban waste in Italy alone is estimated to be of about 24 million tonnes, and the content of putrescible material is of about 11.4 million tonnes, there emerges clearly the importance of stabilization of waste and its enhancement in terms of composting or bio-stabilization in a very short time.

Also in the current scenario of dumping waste, there in any case exists the problem of collection, temporary storage and transportation of huge amounts of organic waste from the domestic site of production to the refuse dump or to the composting plant. Considering that putrescible waste is made up of water for more than 60% of its content, said cost can to a large extent be attributed precisely to the high content of humidity in the waste itself.

WO 99/01361 discloses a ventilated container for use in the collection and storage of waste. Such container has a plurality of vents in the side walls and/or the base, and a plurality of inwardly extending spacers to support an inner bag in such a way that it is spaced apart from the walls of the container. The inner bag can be made of paper or of a permeable polymeric material or a composite material. Among such materials needled polyethylene and Kraft paper are mentioned. The bag can be permeable to liquid and/or vapour, such as water vapour, so that liquid and/or vapour passes from the interior of the bag to its exterior. From the point of view of the structure, the container above requires the presence of the inwardly extending spacers. This makes the structure rather complex and expensive, and does not allow for the use of easily available generic containers with holes. From the point of view of the bag, the ventilated container of WO 99/01361 makes use without distinction of bags made of paper or of polyethylene, i.e. it does not recognize the importance of using bags made of a biodegradable material. Moreover, the bags of the ventilated container of WO 99/01361 may be permeable to liquids, which can percolate from the bag to the external environment.

German Utility Model G 88 06 132.9 discloses a container provided with holes supporting a paper bag where waste is placed. The paper bag is preferably not made on purpose for this application, rather is a re-used paper bag, originally made for a different use, for example as a shopping bag. The container with holes has reportedly a drying effect which avoids anaerobic reactions.

The ventilated systems described in the patent documents above, however, do not take into consideration the technical problem of how to manage waste with a relatively high water content and at the same time avoid the use of non biodegradable materials. A solution based on the use of paper bags or needled polyethylene bags does not guarantee that liquids do not leak from the bag into the environment at the site of temporary storage (e.g. a house). The use of polyethylene bags, either permeable or impermeable to liquids, on the other hand, does not represent a satisfactory solution with respect to biodegradability.

It would therefore be desirable to provide a system for collecting and temporarily storing waste that is made of entirely biodegradable materials and that is capable of solving the problem associated to the high content of humidity in organic waste, hence is capable of reducing the costs for transport and more generally for handling said waste. It should be borne in mind that the loss of even just 10 wt % of said waste would involve, at the level of the country as a whole, a loss of hundreds of thousands of tonnes of water. Apart from the direct economic saving, this would mean among other things thousand of tonnes less of water in the refuse dump, more stabilized waste with reduced problems of smells, and saving in terms of thousands of journeys for heavy lorries. The availability of a system for reducing the content of humidity in organic waste would moreover enable a considerable reduction in the costs of waste disposal for municipalities and, at the same time, would simplify far more organization of differentiated collection of putrescible waste.

An object of the invention is therefore to provide a ventilated system for the collection and temporary storage of organic waste which allows a significant reduction in the weight of said waste prior to its transportation to the dump or to the composting plant, i.e., already at the level of the home environment.

Another object of the invention is to provide a ventilated system for the collection of organic waste which allows a decrease in the formation of moulds and of percolate both during collection and storage or final treatment.

A further object of the invention is to provide a ventilated system in which the waste containing bag is biodegradable.

It is also an object of the invention to provide a ventilated system in which the container for the bag is relatively simple and not expensive.

The above and other objects and advantages of the invention are achieved with a ventilated system for the collection and temporary storage of organic waste, which comprises a rigid container provided with a plurality of holes and a removable bag inserted in and supported by said container, said system being characterized in that:

a) said bag is supported by said container in a spaced relationship with the ground or the surface on which said container is placed, so that air can flow from the bottom into said bag; and b) said bag is obtained from a breathable biodegradable plastic film having a permeability to water vapour higher than 400 g 30 μm/m$^2$ 24 h, said film being substantially impermeable to liquid water.

BEST AND VARIOUS MODES FOR CARRYING OUT DISCLOSURE

Figure 1:
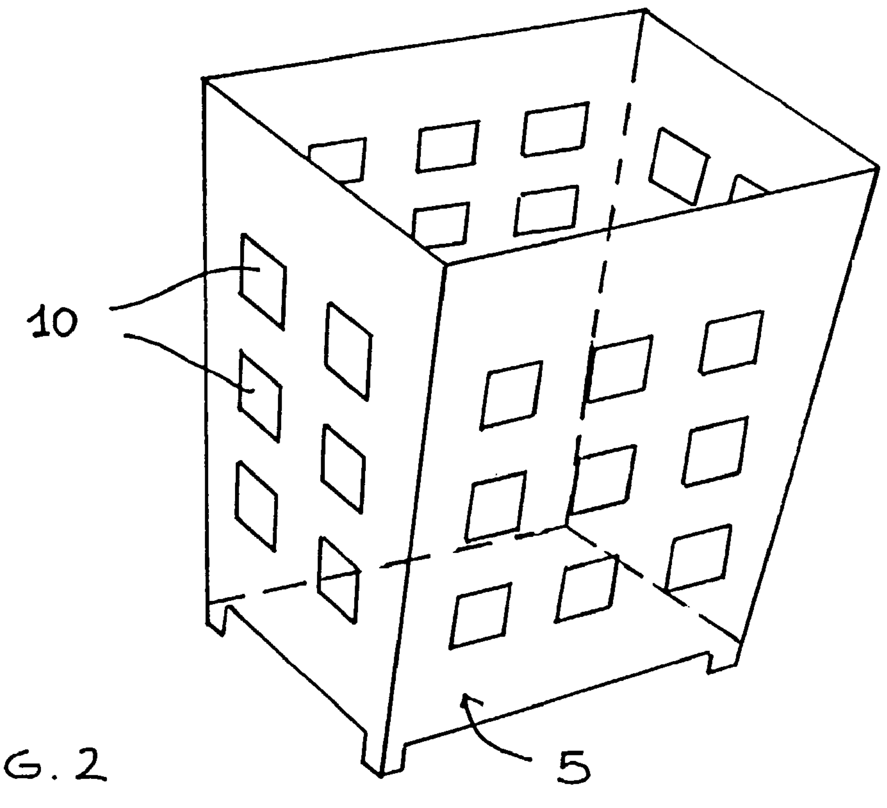
FIGS. 1 and 2 illustrate a first embodiment of a rigid container forming part of a ventilated system according to the present disclosure.

The rigid container of the ventilated system for the collection and temporary storage of waste according to the present invention is a container made of plastic or any other suitable material, which has ventilation holes in its walls and allows for ventilation at the bottom. In a preferred embodiment the container has a bottom provided with holes and is not in direct contact with the ground or surface on which the container rests. According to a more preferred embodiment, the container is provided with a lid, which also has holes.

By "bag obtained from a breathable biodegradable plastic film" according to the present invention is meant a bag obtained from a breathable biodegradable plastic film substantially impermeable to liquid water, having a thickness of between 5 μm and 50 μm, preferably between 10 μm and 40 μm, and having a permeability to water vapour higher than 400 g 30 μm/m$^2$ 24 h, preferably higher than 700 g 30 μm/m$^2$ 24 h. In the context of the present invention said films are defined as breathable films. Even more preferably, said films have a permeability to water vapour higher than 950 g 30 μm/m$^2$ 24 h. In the context of the present invention these are defined as highly breathable films.

The permeability to water vapor is measured on a 30 μm film according to ASTM E 96-90.

In the present description biodegradability means biodegradability according to the EN 13432 standard.

According to a particularly preferred embodiment, the ventilated system according to the present invention comprises highly breathable biodegradable bags.

The biodegradable materials that can be used for the production of the biodegradable bags may be of various nature, such as, for example, biodegradable aliphatic polyesters, aliphatic-aromatic polyesters, polyhydroxyalkanoates, polyhydroxyacids, polyesteramides, starch blends and mixtures thereof, as is known to a person skilled in the art. In the context of the present invention, a particularly preferred embodiment is the one in which the biodegradable bags are produced using starch-based materials.

When the above bags are inserted into the ventilated system according to the present invention, they can yield losses of organic waste higher than 20 wt % of the waste itself, preferably higher than 30 wt % and even more preferably higher than 40 wt %, in 7 days. Particularly suited for the purpose are bags the surface/volume ratio of which is high. Particularly suited for the purpose are bags with a volume of between 5 and 40 l, preferably of between 10 and 30 l.

The present invention also takes into consideration biodegradable bags made of materials that are sufficiently hydrophilic to reach the values of permeability on film exceeding 900 g 30 μm/m$^2$ 24 h, or, if they are less breathable, they are rendered more breathable by means of processes of microperforation using laser techniques or by means of stretching with inorganic or organic fillers that are able to form microperforations. In this case, the films may be non-impermeable to viruses but still retain a substantial impermeability to liquid water.

Starch-based films must contain thermoplastic starch in amounts comprised between 10% and 95%, preferably between 20% and 90%, and still more preferably between 25% and 60% of the total composition. Another essential component are water-insoluble thermoplastic polymers (absorption of water lower than 5% and preferably lower than 2%) with melting points between 50° C. and 160° C., more preferably between 60° C. and 140° C., provided with good compatibility with starch. The same polymers may form the basic raw material for bags obtained by microperforation.

In the case of breathable biodegradable bags produced with starch-based film, preferred films are those deriving from compositions comprising starch and a thermoplastic polyester (or copolyester), in particular a polyester (copolyester) deriving from diacid/diol or from hydroxy acid. For the purposes of the present invention, particularly preferred are polyesters (copolyesters) deriving from diacid/diol of an aliphatic-aromatic type. Polyesters such as polybutylene adipate-co-terephthalate, polyethylene adipate-co-terephthalate, polyethylene sebacate-co-terephthalate and polybutylene sebacate-co-terephthalate are particularly preferred aliphatic-aromatic polyesters.

The mechanical properties of the bags to be used in the ventilated system according to the invention must be adequate for the application for which are designed. This means: tensile properties at 23° C. and 55% RH with ultimate strength higher than 16 MPa, elastic modulus higher than 50 MPa, ultimate elongation higher than 300%.

Figure 2:
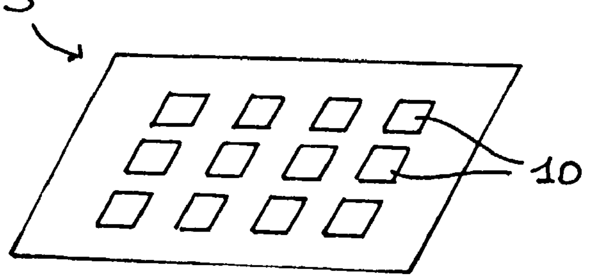

FIGS. 1 and 2 illustrate a first embodiment of the rigid container forming part of the ventilated system according to the invention. In said embodiment, the container has a generally parallelepiped shape, and is provided with a plurality of holes 10 on the walls and on the bottom 5. Furthermore, the container is provided with feet, which enable the bottom 5 not to be directly in contact with the resting surface and allows for ventilation.

The breathable biodegradable plastic bag is inserted in the container and is supported by positioning its flaps on the edge of the container, in a manner not shown in the figures. The presence of ventilation holes on the walls and on the bottom of the container, together with the fact that the bottom is not in direct contact with the ground, allows for the creation of small streams of air, which significantly increase the transpiration of water vapour from the material contained inside the bag through the walls of the bag outwards. The holes on the walls and on the bottom of the container create a true "chimney effect", i.e., a continuous recirculation of air from below upwards in the container itself. This is an important factor to improve the reduction of the content of water of waste.

Figure 3:
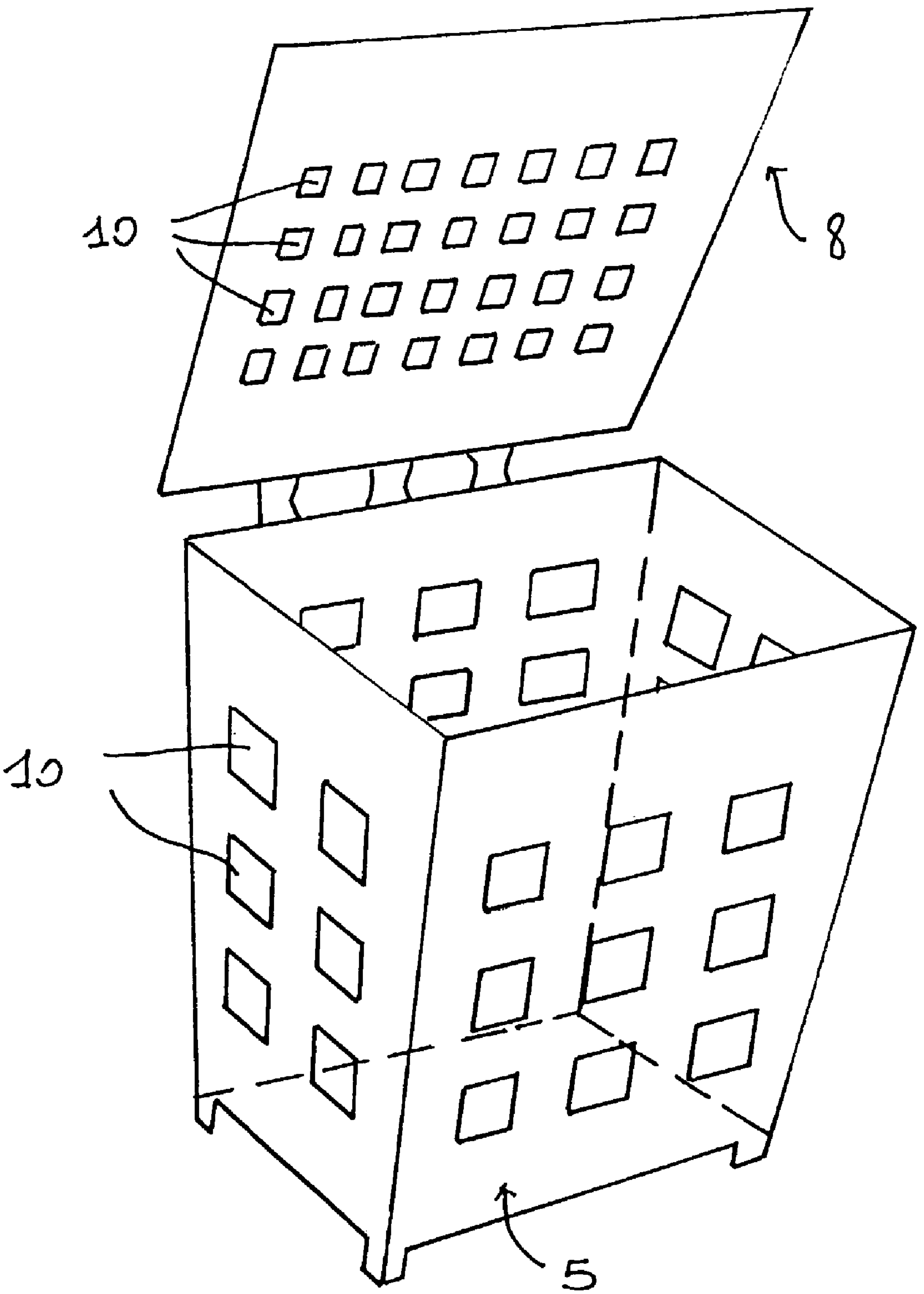
FIG. 3 illustrates an embodiment of a container with a lid having ventilated hole.

According to a particularly preferred embodiment, the container has a lid 8, which is also provided with ventilation holes, as illustrated in FIG. 3. Also in this case, the bottom 5 is the one illustrated in FIG. 2. It is evident that other geometrical shapes of the container, such as cylindrical, are adequate for the purposes of the present invention.

The holes of the domestic container in which the bag is set may be of various shapes. They can therefore be circular, square, oblong, etc. As regards the total surface represented by the holes, i.e., the useful surface for ventilation, particularly preferred are ventilation systems in which the container has the lid and the bottom with a perforated area of more than 20% and a side wall with a perforated area of more than 30%. The fact that the breathable biodegradable bag of the ventilated system of present invention comprises a bag made of a plastic film substantially impermeable to liquid water makes the ventilated system particularly advantageous for the collection and temporary storage of food or kitchen waste, for example as kitchen bin or as waste container to be used in a house or a domestic environment. Paper bag that would break after having been in prolonged contact with humid waste or plastic bag permeable to liquid water would clearly be unsuitable for this application.

The ventilated system according to the invention will now be described with reference to embodiments, which in no way limit the scope of the invention.

EXAMPLE

With a Composition 1 (for highly breathable films) containing:

- 36.4% Globe 03401 Cerestar starch
- 50% Eastar-Bio Ultra (aliphatic-aromatic copolyester) (MFI=3)
- 13.6% glycerine
- 0.2 parts of Erucamide and with a Composition 2 (for breathable films) containing:

- 27% Globe 03401 Cerestar starch
- 66.5% Eastar-Bio Ultra (aliphatic-aromatic copolyester) (MFI=3)
- 6.0% glycerine
- 0.3% Erucamide
- 0.2% beeswax 10-liter bags with a thickness of approximately 20 μm were produced.

The film obtained from Composition 1 had a permeability to water vapour higher than 950 g 30 $\mu m/m^2$ 24 h (highly breathable film). The film obtained from Composition 2 had a permeability to water vapour of 520 g 30 $\mu m/m^2$ 24 h (breathable film).

Three bags, randomly sampled from a homogeneous lot for each of the two compositions, were then put in containers such as the one illustrated in FIG. 3. FIG. 2 illustrates the wall of the bottom of the container.

The assembly made up of the container of FIG. 3 and of each of the breathable bags described above constitutes an embodiment of the ventilated system according to the present invention.

The bags were then filled with 1.5 kg of organic waste made up of boiled pasta (17%), bread (7%), salad (17%), tomatoes (17%), apples (17%), oranges (17%), cooked meat (7%), and paper (1%).

The ventilated system was set in environmental conditions of 70% humidity at 28° C., so as to simulate the conditions of the summer climate in the south of Europe, i.e., the conditions of the season that is most problematical for the collection and temporary storage of the humid fraction of the waste.

The weight loss of the humid waste contained in the bags was measured after 3 days and after 7 days.

The data are given in Table 1 as compared to the data obtained with polyethylene (PE) bags set in a closed system of a traditional type (rubbish bin with lid) or in a ventilated system of the type described in FIG. 1.

TABLE 1

| | Weight Loss | | | |
|---|---|---|---|---|
| | After 3 days | | After 7 days | |
| | g | % | g | % |
| Ventilated system with highly breathable biodegradable bag | 285 | 19.0 | 742 | 49.5 |
| Ventilated system with breathable biodegradable bag | 160 | 10.7 | 473 | 31.5 |
| Ventilated system with PE bag | 132 | 8.8 | 270 | 18 |
| Bin with PE bag | 12.15 | 0.81 | 24.9 | 1.66 |

In the ventilated system according to the invention with a highly breathable bag after 7 days no presence of percolate or mould inside the bag was detected. In the ventilated system according to the invention with a breathable biodegradable plastic bag after 7 days the presence of percolate and moulds in reduced quantities was noted. In the case of the two comparative examples with the PE bag there were instead present signs both of percolate and of mould inside the bag.

The invention claimed is:

1. A ventilated system for the collection and temporary storage of organic waste comprising a rigid container provided with a plurality of holes and a removable bag inserted in and supported by said container, wherein:

a) said bag is supported by said container by positioning its flaps on the edge of the container in a spaced relationship from the ground or the surface on which said container is placed, so that air can flow from the bottom into said bag; wherein the sidewalls of container are flat; and b) said bag is obtained from a breathable biodegradable plastic film having a permeability to water vapour higher than 400 g 30 $\mu m/m^2$ 24 h, said film being substantially impermeable to liquid water and wherein the breathable biodegradable plastic film comprises one or more biodegradable polymers selected from the group consisting of biodegradable aliphatic polyesters, biodegradable aliphatic-aromatic polyesters, biodegradable polyhydroxyalkanoates, biodegradable polyhydroxyacids and biodegradable polyesteramides.

2. Ventilated system according to claim 1, characterized in that said bag is obtained from a breathable biodegradable plastic film having a permeability to water vapour higher than 700 g 30 $\mu m/m^2$ 24 h.

3. Ventilated system according to claim 1, characterized in that said bag is obtained from a breathable biodegradable plastic film having a permeability to water vapour higher than 950 g 30 $\mu m/m^2$ 24 h.

4. Ventilated system according to claim 1, characterized in that said bag is obtained from a breathable biodegradable plastic film having a permeability to water vapour comprised between 400 and 950 g 30 $\mu m/m^2$ 24 h.

5. Ventilated system according to claim 1, characterized in that said bag obtained from a breathable biodegradable plastic film has a thickness, comprised between 5 and 50 μm.

6. Ventilated system according to claim 5, characterized in that said bag obtained from a breathable biodegradable plastic film has a thickness comprised between 10 and 40 μm.

7. Ventilated system according to claim 1, characterized in that said bag is obtained from a breathable biodegradable plastic, film comprising a starch-based composition.

8. Ventilated system according to claim 7, characterized in that said breathable biodegradable plastic film has a content of starch comprised in the range between 10% and 95% and further comprises a water-insoluble thermoplastic polymer with a meting point comprised between 50° C. and 160° C.

9. Ventilated system according to claim 8, characterized in that said breathable biodegradable plastic film has a content of starch comprised in the range between 20% and 90%.

10. Ventilated system according to claim 8, characterized in that said breathable biodegradable plastic film has a content of starch comprised in the range between 25% and 60%.

11. Ventilated system according to claim 8, characterized in that said water-insoluble thermoplastic polymer has a melting point comprised between 60° C. and 140° C.

12. Ventilated system according to claim 8, characterized in that said thermoplastic polymer is a thermoplastic (co) polyester.

13. Ventilated system according to claim 12, characterized in that said thermoplastic (co)polyester is, a (co)polyester deriving from diacid/diol or hydroxy acid.

14. Ventilated system according to claim 13, characterized in that said (co)polyester is of an aliphatic-aromatic (co) polyester.

15. Ventilated system according to claim 14, characterized in that said (co)polyester is selected from the group consisting of polybutylene adipate-co-terephthalate, polyethylene adipate-co-terephthalate, polyethylene sebacate-co-terephthalate and polybutylene sebacate-co-terephthalate.

16. Ventilated system according to claim 1, characterized that said bag has a surface/volume ratio of between 5 and 40 l.

17. Ventilated system according to claim 16, characterized in that said surface/volume ratio is of between 10 and 30 l.

18. Ventilated system according to claim 1, characterized in that said rigid container has a lid (8) provided with ventilation holes (10).

19. Ventilated system according to claim 1, characterized iii that said rigid container has a bottom (5) provided with ventilation holes (10), said bottom being spaced from the ground or the surface on which the container is placed.

20. Ventilated system according to claim 18, characterized in that said lid and bottom of said rigid container have a perforated area of more than 20%, and the side wall of said rigid container has a perforated area of more than 30%.

* * * * *